(12) United States Patent
Malgorn et al.

(10) Patent No.: US 7,238,216 B2
(45) Date of Patent: Jul. 3, 2007

(54) VARIABLE FLOW INERTIAL GAS-LIQUID IMPACTOR SEPARATOR

(75) Inventors: Gerard Malgorn, Quimper (FR); Jean-Luc Guichaoua, Combrit (FR); Peter K. Herman, Cookeville, TN (US); Brian W. Schwandt, Fort Atkinson, WI (US); Christopher E. Holm, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 343 days.

(21) Appl. No.: 10/946,603

(22) Filed: Sep. 21, 2004

(65) Prior Publication Data

US 2006/0059875 A1 Mar. 23, 2006

(51) Int. Cl.
B01D 45/04 (2006.01)

(52) U.S. Cl. .............. 55/418; 55/329; 55/332; 55/465; 55/468; 55/DIG. 14

(58) Field of Classification Search .......... 55/418–420, 55/329, 332, 465, 468, DIG. 14, DIG. 19
See application file for complete search history.

(56) References Cited

U.S. PATENT DOCUMENTS

| 5,564,401 | A | * | 10/1996 | Dickson ............... 123/573 |
| 6,247,463 | B1 | * | 6/2001 | Fedorowicz et al. ........ 123/572 |
| 6,279,556 | B1 | | 8/2001 | Busen et al. |
| 6,290,738 | B1 | * | 9/2001 | Holm ............ 55/309 |
| 6,354,283 | B1 | * | 3/2002 | Hawkins et al. ......... 123/572 |
| 6,478,019 | B2 | * | 11/2002 | Fedorowicz et al. ........ 123/572 |
| 6,505,615 | B2 | | 1/2003 | Pietschner |
| 6,576,045 | B2 | | 6/2003 | Liu et al. |
| 6,626,163 | B1 | | 9/2003 | Busen et al. |
| 6,684,864 | B1 | | 2/2004 | Busen et al. |

* cited by examiner

*Primary Examiner*—Duane Smith
*Assistant Examiner*—Sonji Turner
(74) *Attorney, Agent, or Firm*—Andrus, Sceales, Starke & Sawall, LLP; J. Bruce Schelkopf

(57) ABSTRACT

An inertial gas-liquid impactor separator has a variable flow actuator for varying cumulative gas-liquid flow through acceleration nozzle structure in response to a given parameter.

14 Claims, 18 Drawing Sheets

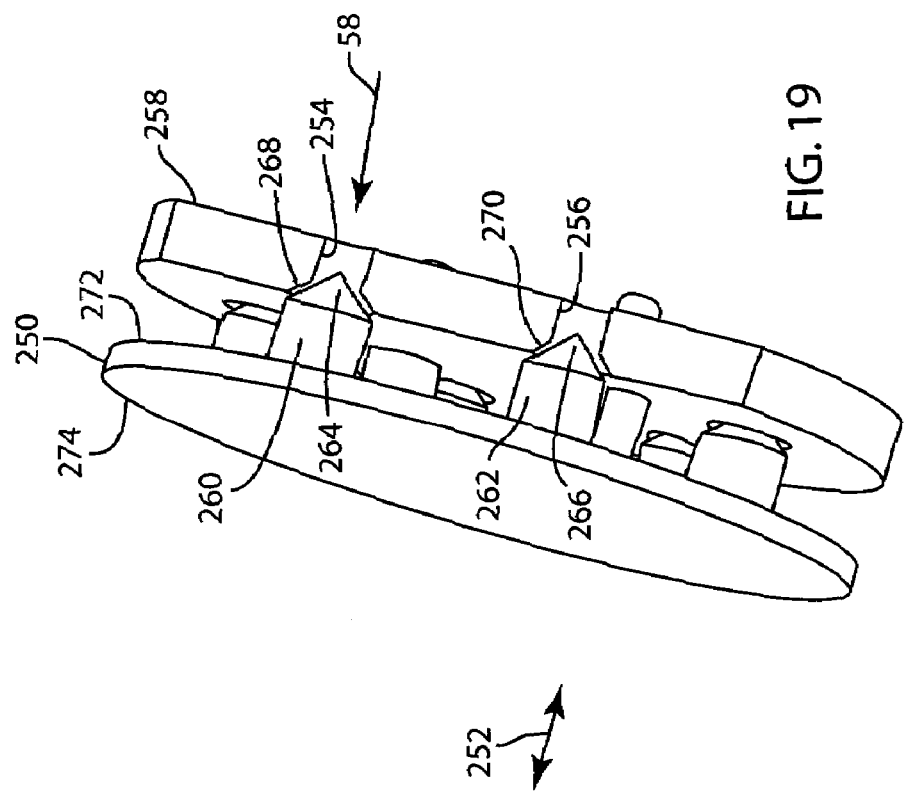

VARIABLE FLOW INERTIAL GAS-LIQUID IMPACTOR SEPARATOR

BACKGROUND AND SUMMARY

The invention relates to inertial gas-liquid impactor separators for removing and coalescing liquid particles from a gas-liquid stream, including in engine crankcase ventilation separation applications, including closed crankcase ventilation (CCV) and open crankcase ventilation (OCV).

Inertial gas-liquid separators are known in the prior art. Liquid particles are removed from a gas-liquid stream by accelerating the stream or aerosol to high velocities through nozzles or orifices and directing same against an impactor, typically causing a sharp directional change, effecting the noted liquid separation. Such inertial impactors have various uses, including in oil separation applications for blow-by gases from the crankcase of an internal combustion engine.

The present invention provides improvements in inertial gas-liquid impactor separators, including variable flow.

BRIEF DESCRIPTION OF THE DRAWING

FIG. 19 is a schematic perspective view of a portion of another inertial gas-liquid impactor separator in accordance with the invention.

DETAILED DESCRIPTION

Figure 1:
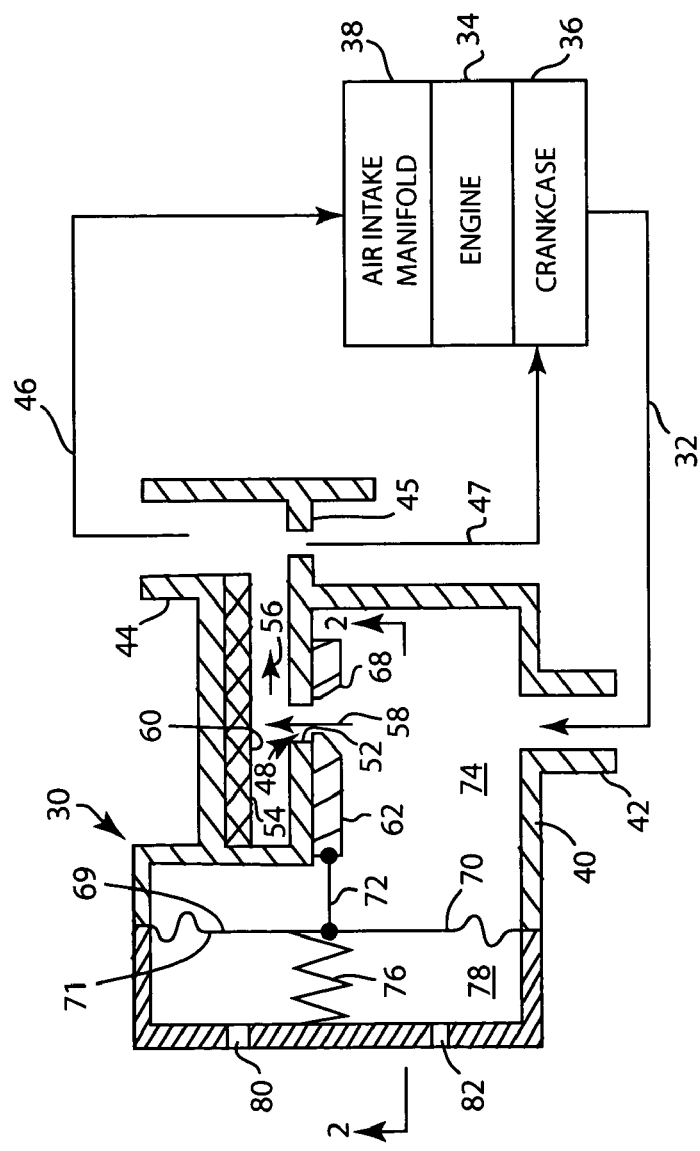
FIG. 1 is a schematic sectional illustration of an inertial gas-liquid impactor separator in accordance with the invention.

FIG. 1 shows an inertial gas-liquid impactor separator 30 for coalescing and removing liquid particles from a gas-liquid stream 32, shown in an exemplary crankcase ventilation separation application for an internal combustion engine 34. In such application, it is desired to vent blow-by gases from crankcase 36 of engine 34. Untreated, these gases contain particulate matter in the form of oil mist and soot. It is desirable to control the concentration of the contaminants, especially if the blow-by gases are to be recirculated back to the engine's air intake system, for example at air intake manifold 38. The oil mist droplets are generally less than 5μ in diameter, and hence are difficult to remove using conventional fibrous filter media while at the same time maintaining low flow resistance as the media collects and becomes saturated with oil and contaminants.

Separator 30 includes a housing 40 having an inlet 42 for receiving gas-liquid stream 32 from engine crankcase 36, an outlet 44 for discharging a gas stream 46 to air intake manifold 38, and a drain 45 draining separated fluid at 47 from impactor collector 54 and returning collected oil droplets at 47 to crankcase 36. Nozzle structure 48 in the housing has a plurality of nozzles provided by orifices such as 50, 52, FIGS. 1, 2, receiving the gas-liquid stream at 58 from inlet 42 and accelerating the gas-liquid stream through nozzles 50, 52. The plurality of nozzles provides a cumulative flow in parallel therethrough. An inertial impactor collector 54 in the housing is in the path of the accelerated gas-liquid stream at 58 and causes liquid particle separation by a sharp directional change as shown at 56. In the preferred embodiment, impactor collector 54 has a rough porous collection or impingement surface 60 causing liquid particle separation from the gas-liquid stream, and is like that shown in U.S. Pat. No. 6,290,738, incorporated herein by reference. Nozzle orifices 50, 52 may have a venturi or frustoconical shape as in the incorporated '738 patent.

Figure 2:
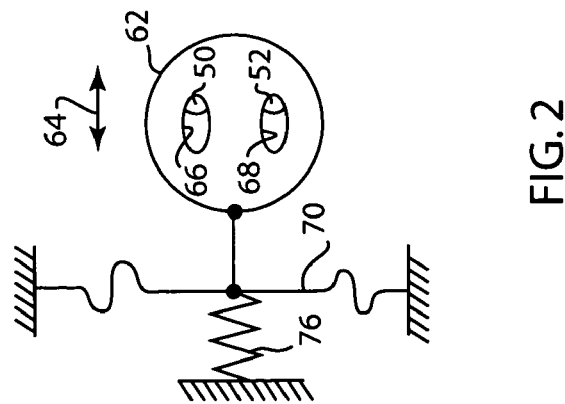
FIG. 2 is a sectional view taken along line 2-2 of FIG. 1.

A variable flow actuator 62 varies the cumulative flow through the plurality of nozzles in response to a given parameter. In one desirable embodiment, cumulative flow velocity is varied, though other flow characteristics may be varied. The gas-liquid stream flows axially along an axial flow direction at 58 through orifices 50, 52. Actuator 62 is movable along a given direction relative to the orifices to vary the noted cumulative flow. In one embodiment, actuator 62 is moveable along the noted given direction relative to the orifices to vary the total area and hence the resultant flow velocity. In FIGS. 1, 2, actuator 62 is a disk or plate movable across one or more of the orifices to change the cross-sectional area thereof transverse to axial flow direction 58. Disk 62 is movable as shown at arrow 64 left-right in FIGS. 1, 2, transversely to axial flow direction 58. In the embodiment of FIGS. 1, 2, disk 62 as a plurality of elongated slots or openings 66, 68 aligned with respective nozzle orifices 50, 52 and transversely slidable therealong to vary the size thereof available to axial flow therethrough, and hence to vary the cumulative flow area. In a further embodiment, one or more of nozzle orifices 50, 52 may be closed or opened during movement of disk 62, to thus vary the number of orifices available to axial flow therethrough, to thus vary the noted cumulative flow area. In a further embodiment, movement of actuator disk 62 varies both the size and number of the orifices, for example movement of actuator disk 62 back and forth along direction 64 may expand and restrict the orifices along a cross-sectional area thereof transverse to flow direction 58, to vary the size of the orifices, and movement of actuator disk 62 back and forth along direction 64 may open and close other of the orifices, to vary the number of orifices through which the gas-liquid stream flows.

In one embodiment, the noted parameter to which variable flow actuator 62 responds is pressure of the gas-liquid stream. Housing 40 includes a pressure sensor 70 in the form of a diaphragm or membrane coupled through link 72 to actuator 62 to actuate the latter to move left-right at 64 in FIGS. 1, 2. As the pressure of the gas-liquid stream increases, diaphragm 70 moves leftwardly in FIG. 1, which in preferred form increases the size of orifices 50, 52, etc. (increases the cross-sectional flow area thereof) and/or increases the number of orifices 50, 52, etc. open to flow therethrough. The increasing pressure of the gas-liquid flow stream in housing chamber 74 overcomes the bias spring 76 to cause leftward movement of diaphragm 70. If the gas-liquid flow pressure decreases, then biasing spring 76 moves actuator disk 62 rightwardly in FIG. 1, preferably to reduce the size and/or number of orifices 50, 52, etc. In this manner, a desired pressure differential ΔP (delta P) is maintained, eliminating the need to make compromises between minimum and maximum flow rates, engine sizes, changing conditions such as engine wear, speed, braking, etc. The variable flow actuator maximizes efficiency by adapting to different engine sizes, flow ratings, and changing conditions during engine operation, and overcomes prior trade-offs required in a fixed flow separator. In the embodiment of FIG. 1, housing chamber 78 on the opposite side of diaphragm 70 from chamber 74 is vented to atmosphere as at vent openings 80, 82, for referencing ΔP, though other reference pressures may be used.

Figure 3:
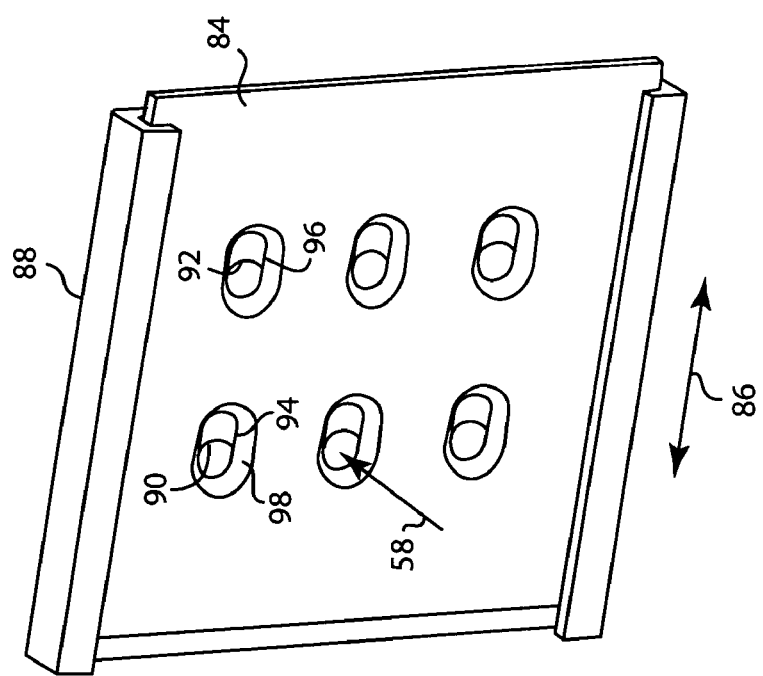
FIG. 3 is a schematic perspective view of a portion of FIG. 1 but showing another embodiment.
Figure 5:
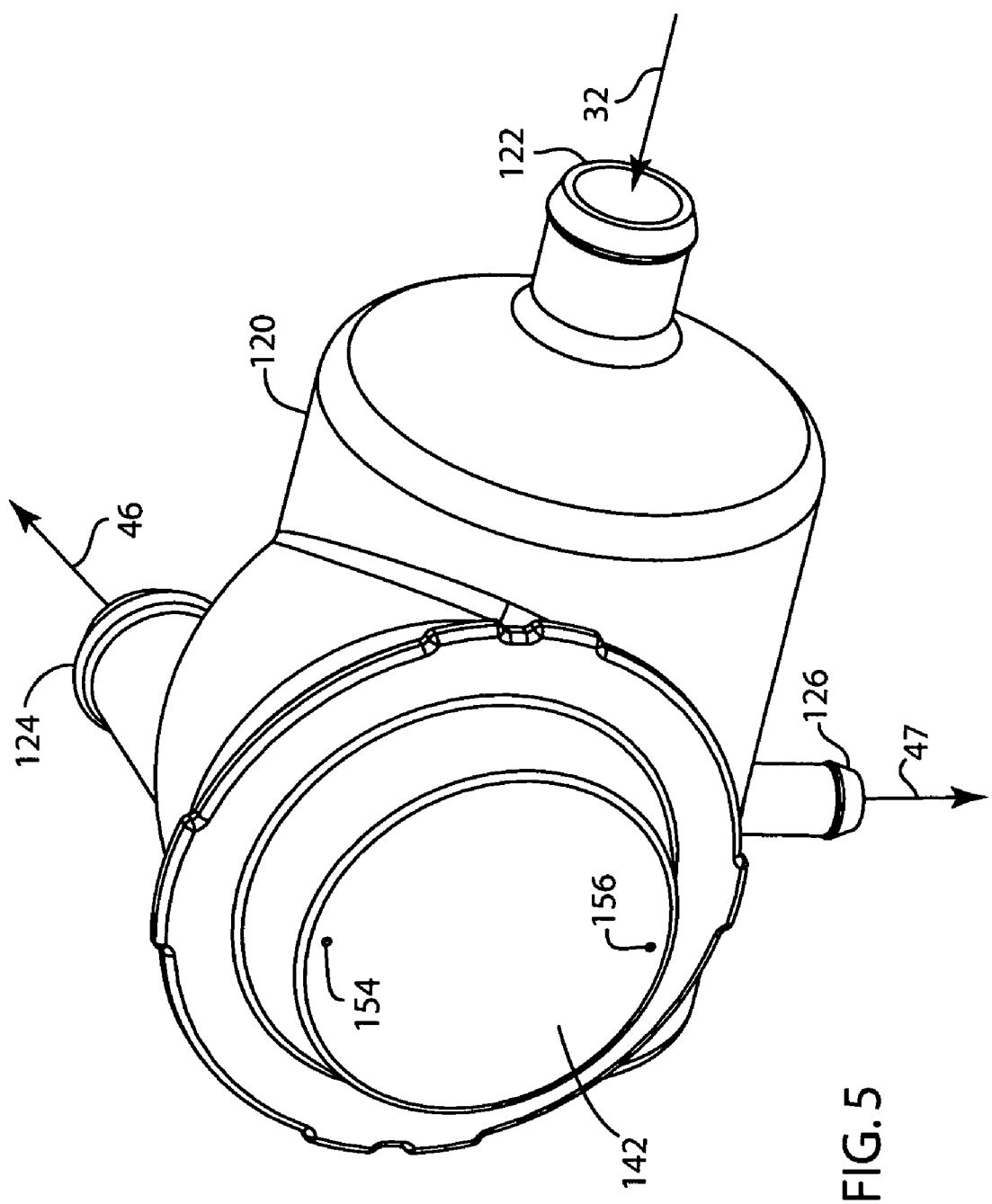
FIG. 5 is a perspective elevational view of an inertial gas-liquid impactor separator incorporating the embodiment of FIG. 4.
Figure 6:
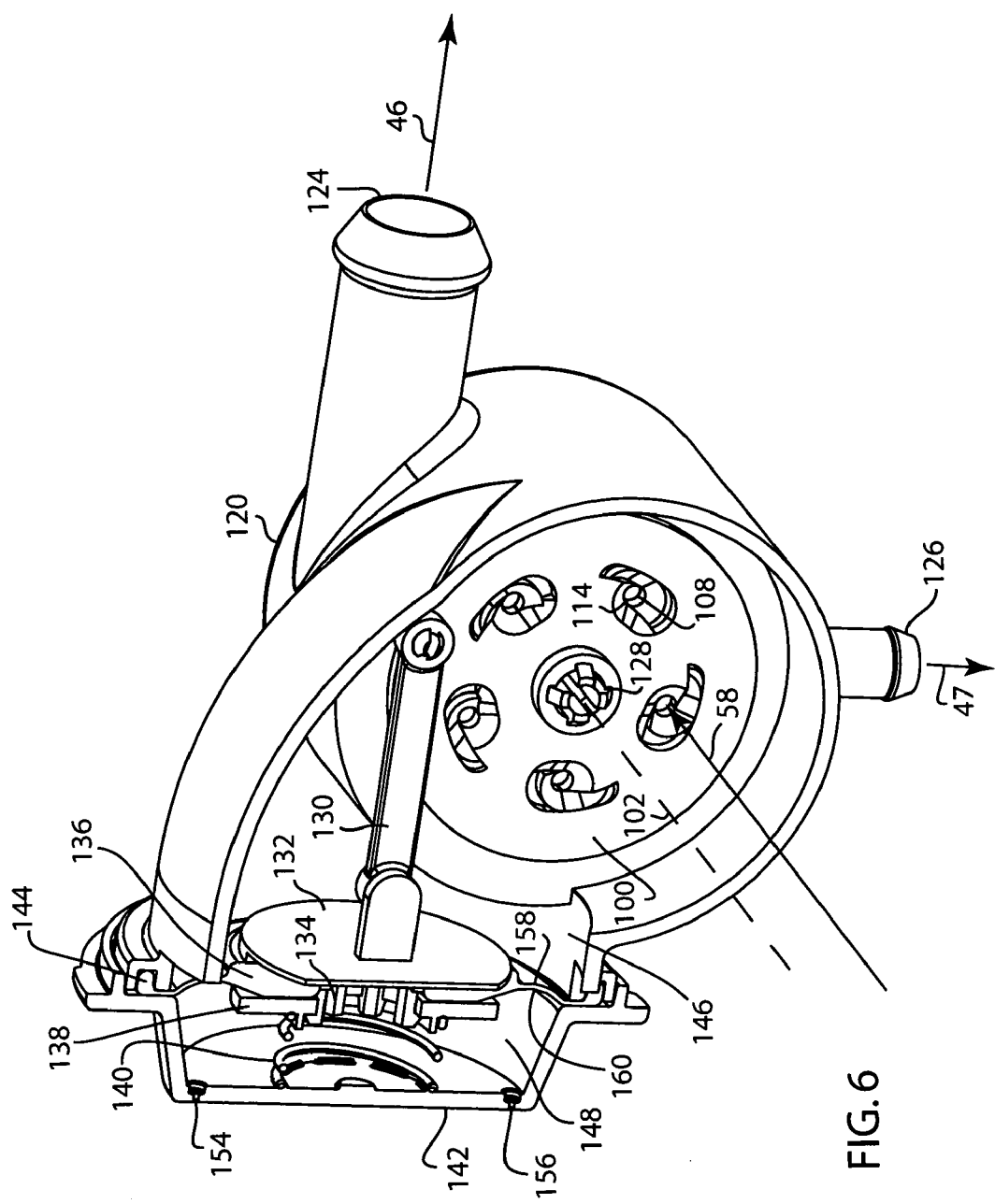
FIG. 6 is a perspective view partially broken away of the construction of FIG. 5.
Figure 7:
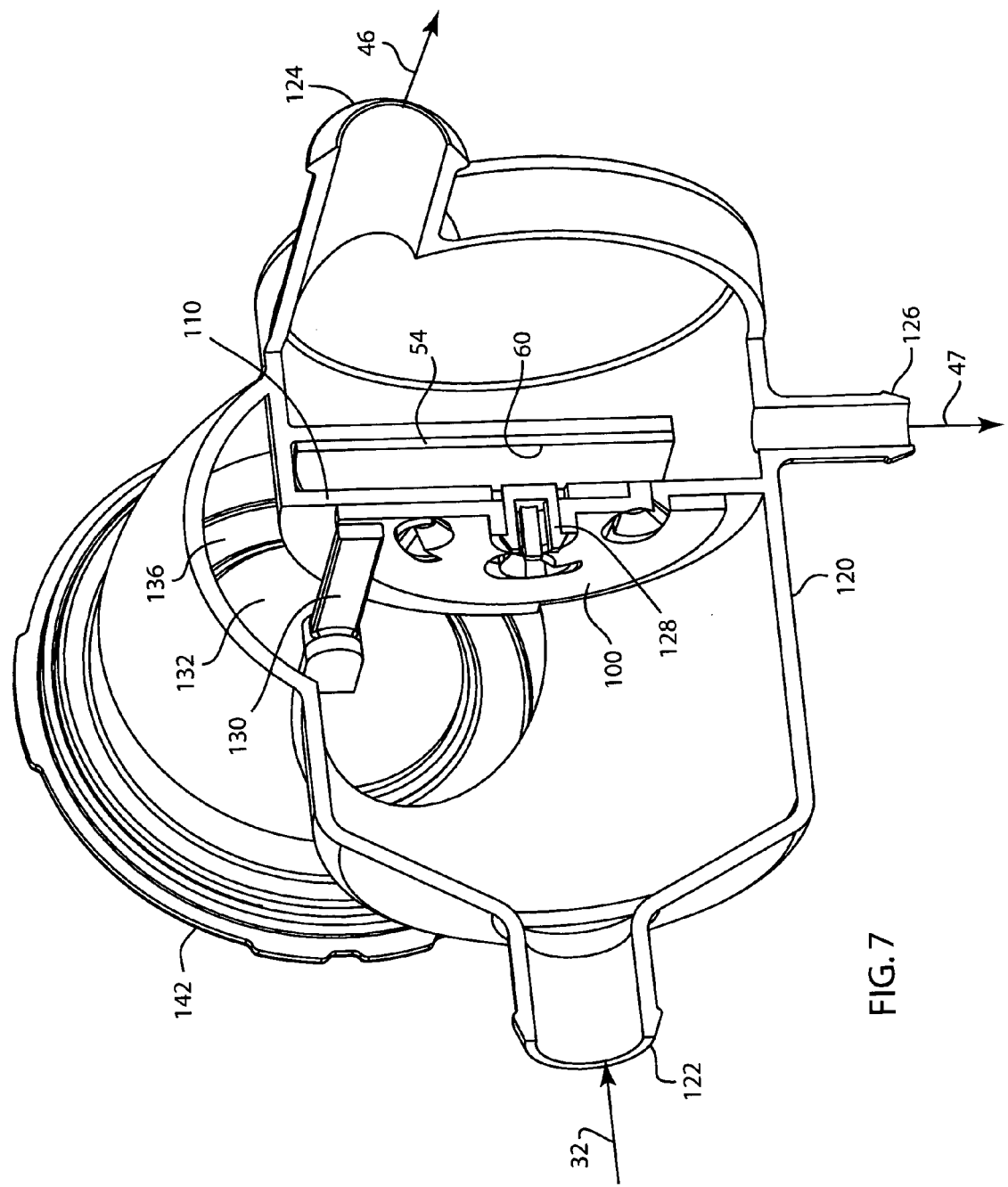
FIG. 7 is a perspective view partially broken away of the construction of FIG. 5.
Figure 8:
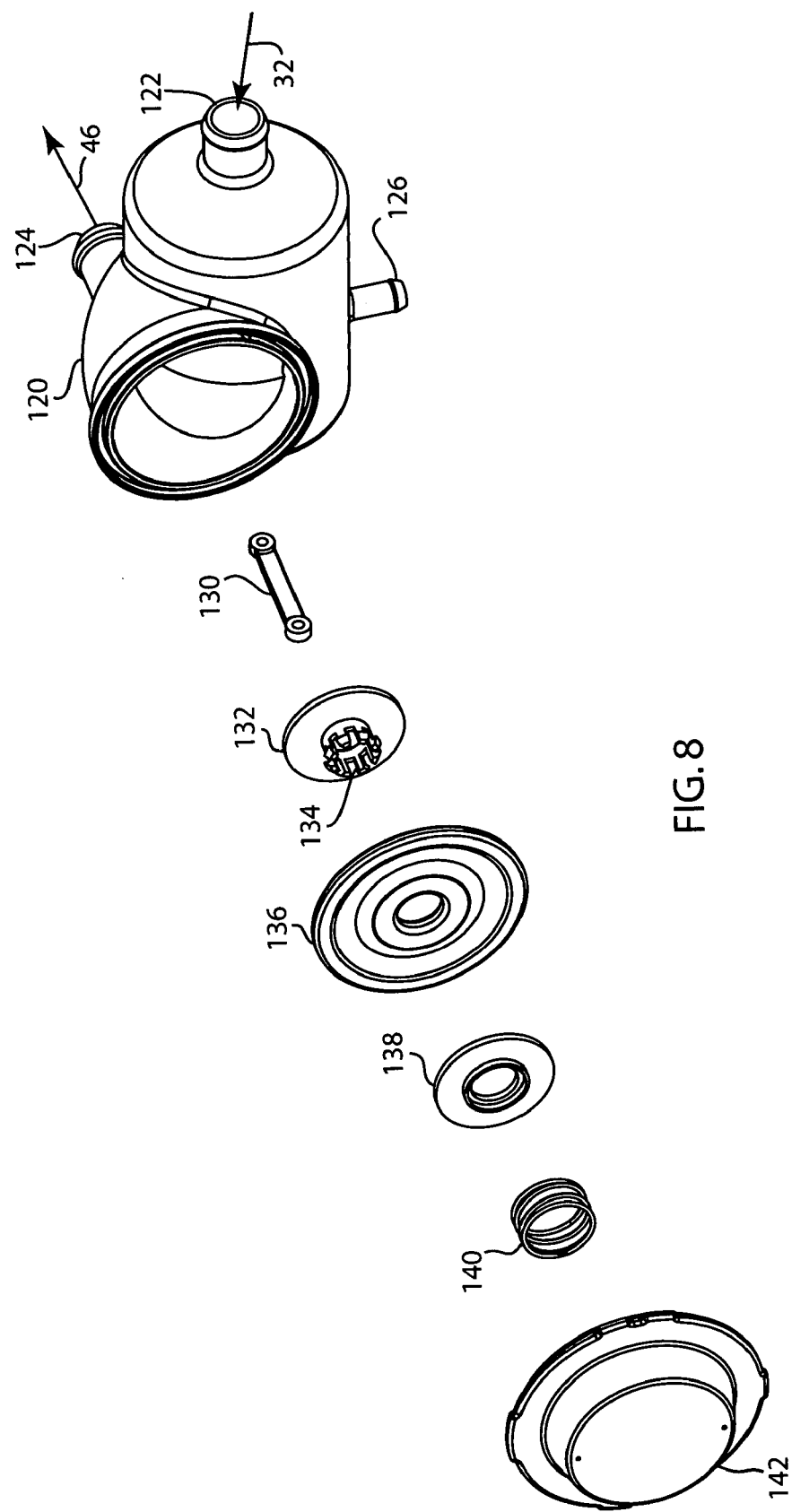
FIG. 8 is an exploded perspective view of a portion of FIG. 5.

FIG. 3 shows a further embodiment having an actuator plate or disk 84 translationally slidable left-right as shown at arrow 86 along housing 88 to vary the size of nozzle orifices such as 90, 92, as elongated slots or openings 94, 96 of disk 84 moved therealong. Slots or openings 94, 96 may have a frustoconical taper 98 to enhance the noted venturi acceleration effect. As disk 84 moves leftwardly in FIG. 3, the size of venturi orifices 90, 92 increases, i.e. leftward movement of actuator disk 84 expands the size of orifices 90, 92 along a cross-sectional area thereof transverse to axial flow direction 58, to vary the size of the orifices. Rightward movement of actuator disk 84 restricts orifices 90, 92 along the cross-sectional area thereof transverse to axial flow direction 58. Alternatively, or additionally, leftward movement of actuator disk 84 may open additional orifices, and rightward movement of actuator disk 84 may close some orifices, to vary the number of orifices through which the gas-liquid stream flows.

Figure 4:
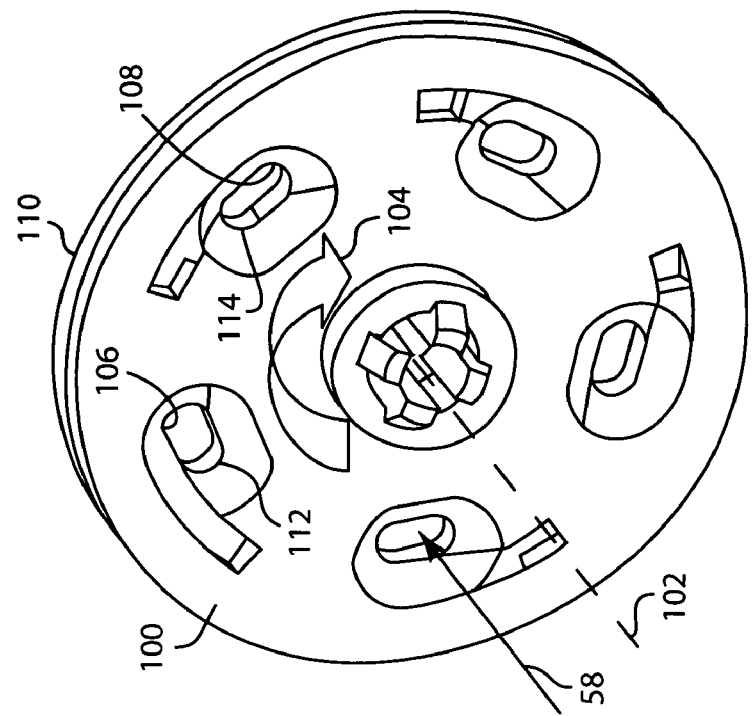
FIG. 4 is a schematic perspective view of a portion of FIG. 1 but showing another embodiment.

FIG. 4 shows another embodiment having an actuator disk 100 rotatable about a rotation axis 102 parallel to axial flow direction 58. Actuator disk 100 is rotatable clockwise as shown at arrow 104 about axis 102 to restrict and/or close one or more nozzle orifices 106, 108, etc., of housing wall 110, as slots 112, 114 in actuator disk 100 slide transversely thereacross.

FIGS. 5-10 show a preferred implementation of the embodiment of FIG. 4. Housing 120 has an inlet 122, comparable to inlet 42, FIG. 1, for receiving the gas-liquid stream 32, e.g. from crankcase 36. Housing 120 has an outlet 124, comparable to outlet 44, FIG. 1, for discharging gas stream 46, e.g. to air intake manifold 38. Housing 120 has a drain 126, comparable to drain 45, FIG. 1, draining separated fluid 47 from impactor collector 54, e.g. returning collected oil droplets at 47 to crankcase 36. Actuator disk 100 is rotationally mounted to housing spindle 128 to rotate about axis 102. Disk 100 is connected by link 130 to diaphragm plate 132 having legs 134 extending through diaphragm 136 and mounted on the opposite side to spring plate 138, such that diaphragm 136 is sandwiched between plates 132 and 138. Biasing spring 140 bears between spring plate 138 and closure cap 142 mounted to the housing and sealed thereto at perimeter 144 and providing a first chamber 146 on one side of the diaphragm, and a second chamber 148 on the other side of the diaphragm.

Figure 9:
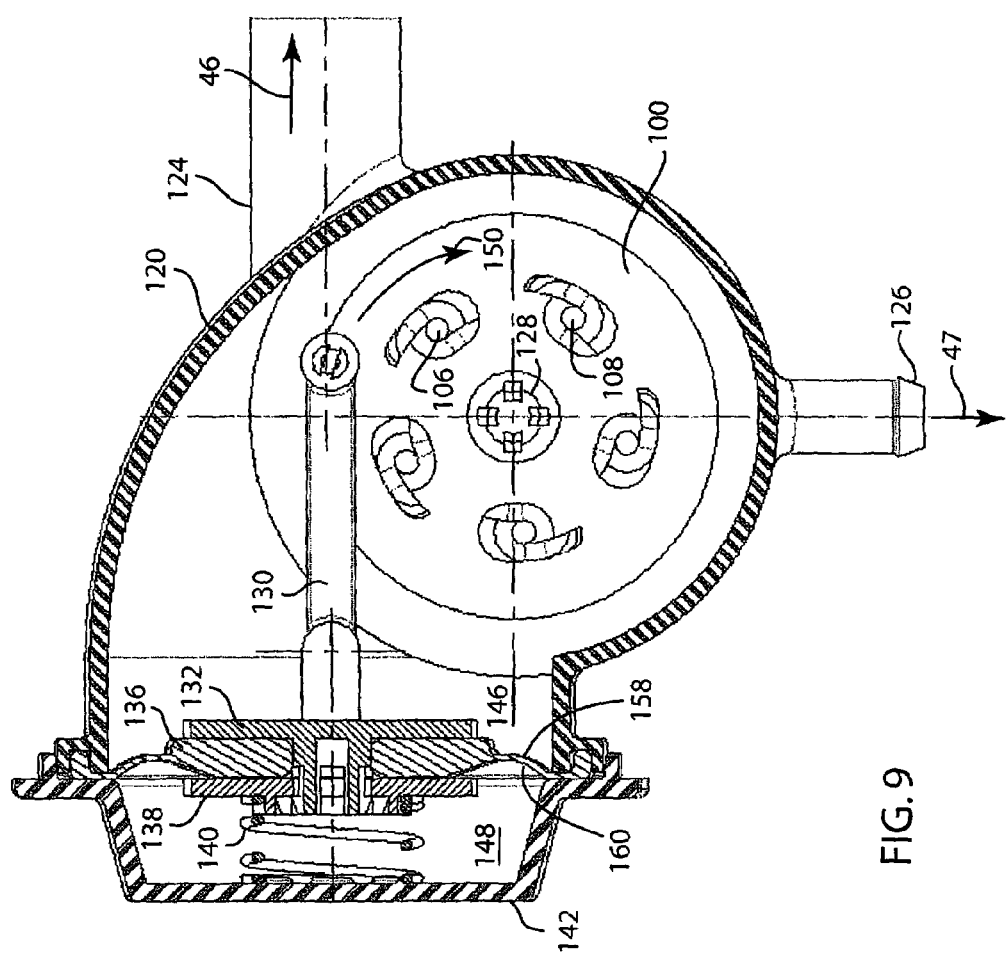
FIG. 9 is a sectional view of the construction of FIG. 5 showing a first position of the actuator.
Figure 10:
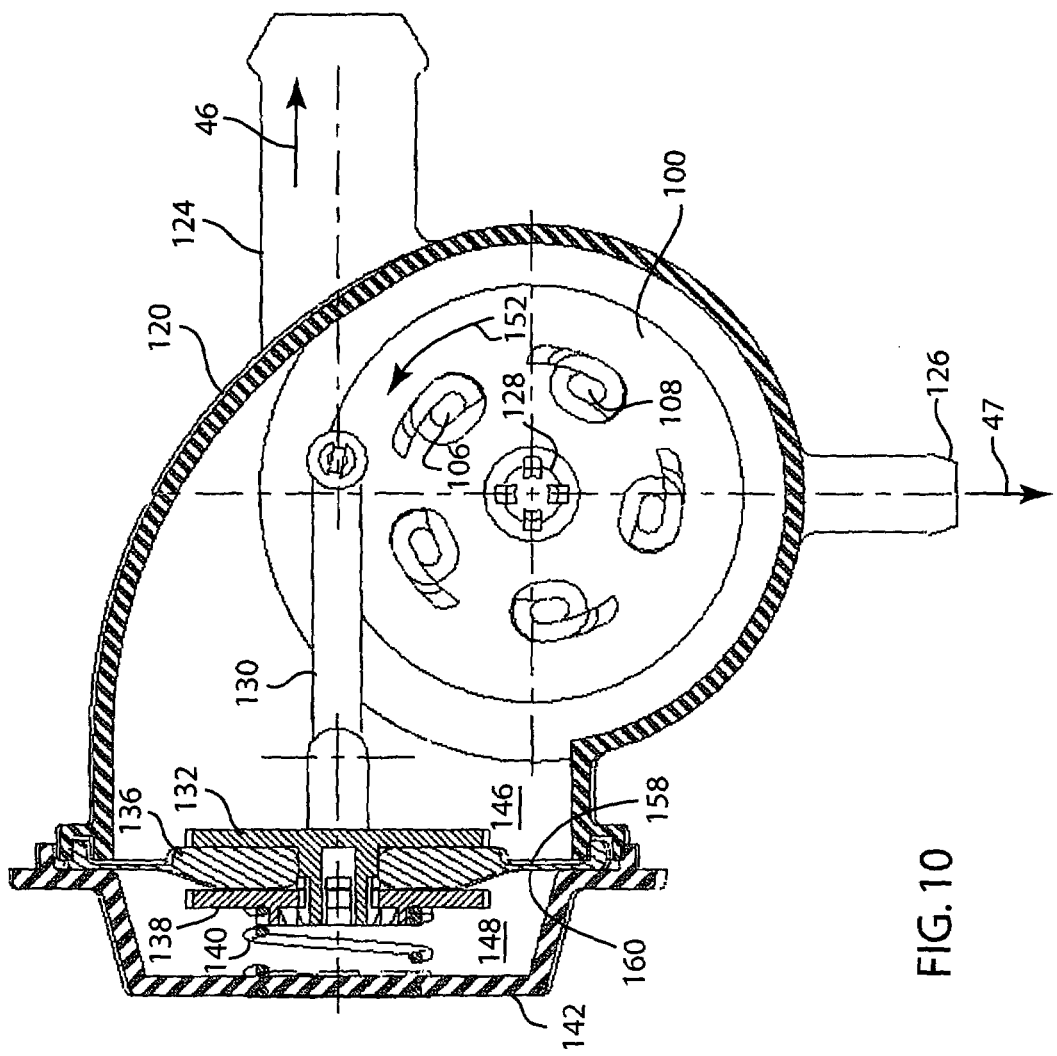
FIG. 10 is like FIG. 9 and shows another position of the actuator.

FIG. 9 shows a low pressure condition of the gas-liquid flow stream 32, with actuator disk 100 rotated clockwise as shown at arrow 150 to a first position minimizing cumulative flow through the plurality of nozzle orifices 106, 108, etc., for example restricting the size of one or more such orifices and/or closing one or more of such orifices. FIG. 10 shows a higher pressure condition of gas-liquid flow stream 32, with actuator disk 100 rotated counterclockwise as shown at arrow 152 to a second position maximizing cumulative flow through the plurality of nozzle orifices 106, 108, etc., e.g. by expanding one or more of such orifices and/or opening one or more of such orifices. The actuator has a plurality of positions between its minimum and maximum cumulative flow positions in response to pressure of the gas-liquid stream to maintain the pressure constant, i.e. maintain a constant ΔP relative to a given reference. The given reference may be atmospheric pressure, for example as provided by one or more vent openings 154, 156 in end cap 142 communicating with chamber 148.

In the embodiment of FIGS. 5-10, the noted pressure sensor is provided by diaphragm 136 having first and second opposite sides 158 and 160, with the first side 158 coupled through plate 132 and link 130 to actuator disk 100, comparably to diaphragm 70, FIG. 1, having first and second opposite sides 69 and 71, with first side 69 coupled through link 72 to actuator disk 62. One of the first and second sides of the diaphragm is exposed to pressure in the gas-liquid stream 32 to control movement of the actuator. In FIGS. 1 and 9, the noted first side 69, 158 of the respective diaphragm 70, 136 is exposed to pressure in the gas-liquid stream to control movement of the actuator. In other embodiments, to be described, the second side of the diaphragm is exposed to pressure in the gas-liquid stream to control movement of the actuator. In FIGS. 1-2 and 5-10, the biasing member 76, 140 is overcome by a given pressure in gas-liquid stream 32 in respective chamber 74, 146 on respective first side 69, 158 of respective diaphragm 70, 136.

Figure 11:
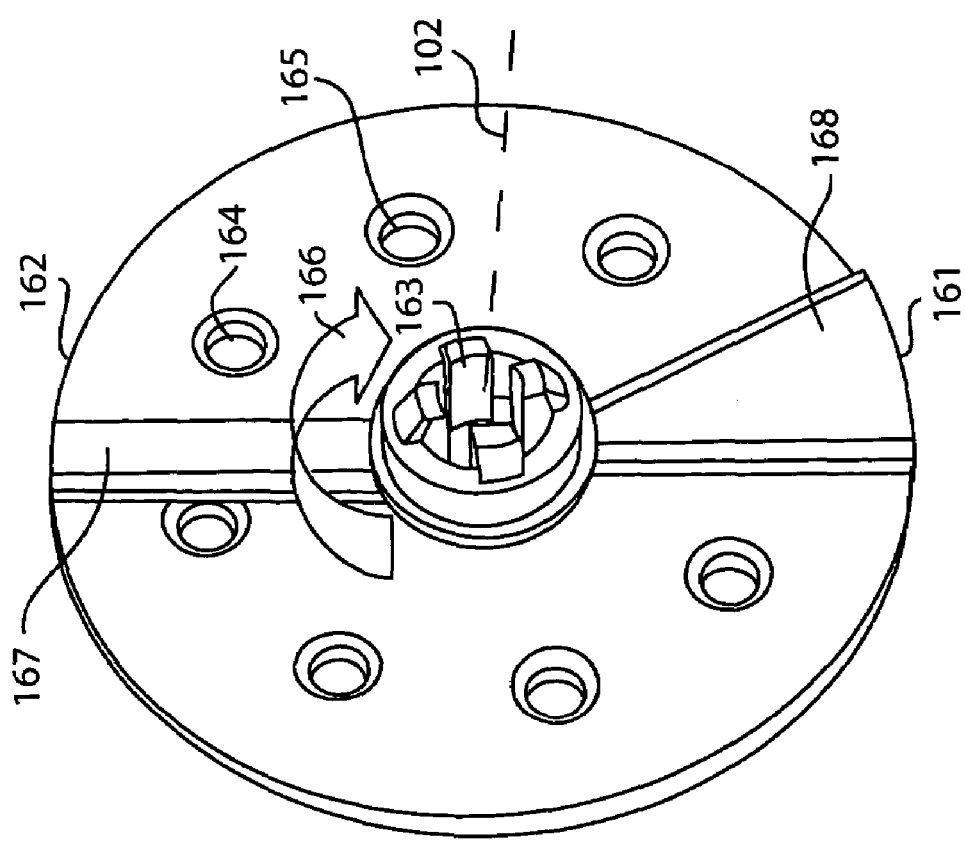
FIG. 11 is a schematic perspective view of a portion of FIG. 1 but showing another embodiment.

FIG. 11 shows another embodiment having an actuator disk 161 rotatable about rotation axis 102 parallel to axial flow direction 58. Actuator disk 161 is rotationally mounted on housing plate 162 at spindle 163 and is rotational to open or close one or more nozzle orifices such as 164, 165, etc. Upon rotation of disk 161 as shown at arrow 166, one or more radial arms 167, 168 of the disk, which may have differing arcuate lengths, open or close respective nozzle orifices, to thus vary the noted cumulative flow through the nozzle structure by varying the number of nozzle orifices available for flow therethrough.

Figure 12:
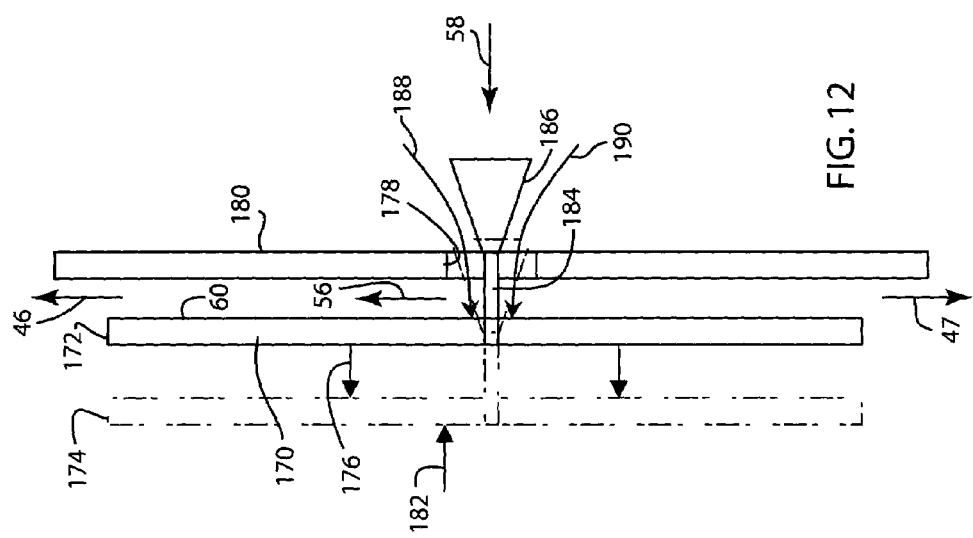
FIG. 12 is a schematic illustration of a portion of another inertial gas-liquid impactor separator in accordance with the invention.

FIG. 12 shows another embodiment having an actuator disk 170 translational along a direction parallel to axial flow direction 58. Actuator 170 is movable from solid line position 172 to dashed line position 174 along arrow 176 in the same direction as axial flow direction 58 to decrease the noted cumulative flow of the gas-liquid stream by restricting or closing nozzle orifices such 178 in housing wall 180.

Actuator 170 is movable from dashed line position 174 to solid line position 172 as shown at arrow 182 in the opposite direction to axial flow direction 58, to increase the noted cumulative flow. The actuator includes valve stems such as 184 having respective conically shaped valve heads such as 186 engageable with respective valve seats provided by the nozzle orifices such as 178. The valve head 186 is conically shaped along a taper which narrows toward a direction pointing in the same direction as axial flow direction 58. The valve seats may be conically shaped complementally to the valve heads. In an open valve condition as shown in solid line at 172, the gas-liquid stream flows as shown at 188, 190 through nozzle orifice 178 and strikes impaction surface 60, which may be the facing surface of actuator 170 or may be provided by an impactor collector such as 54 mounted thereto, causing liquid particle separation as above.

FIGS. 13-18 show a preferred implementation of the embodiment of FIG. 12. Housing 200 has an inlet 202, comparable to inlet 42, FIG. 1, for receiving the gas-liquid stream 32, e.g. from crankcase 36. Housing 200 has an outlet 204, comparable to outlet 44, FIG. 1, for discharging gas stream 46, e.g. to air intake manifold 38. Housing 200 has a drain 206, comparable to drain 45, FIG. 1, draining separated fluid 47 from impactor collector 54, e.g. returning collected oil droplets at 47 to crankcase 36. Inner housing wall 180 has a plurality of nozzle orifices 178, 208, etc. Actuator disk 170 has a plurality of valve stems 184, 210, etc. having respective valve heads 186, 212, etc. opening and closing and/or restricting and expanding respective nozzle orifices 178, 208, etc. Actuator disk 170 is mounted on diaphragm 214 which is sealed at its periphery 216 in the housing. The housing includes a chamber 218 receiving the gas-liquid stream from inlet 202, a subchamber 220 between inner housing wall 180 and first side 222 of diaphragm 214, and a chamber 224 on the second side 226 of the diaphragm. The housing is closed by a first closure cap 228 enclosing chamber 218, and a second closure cap 230 enclosing chamber 224.

Figure 13:
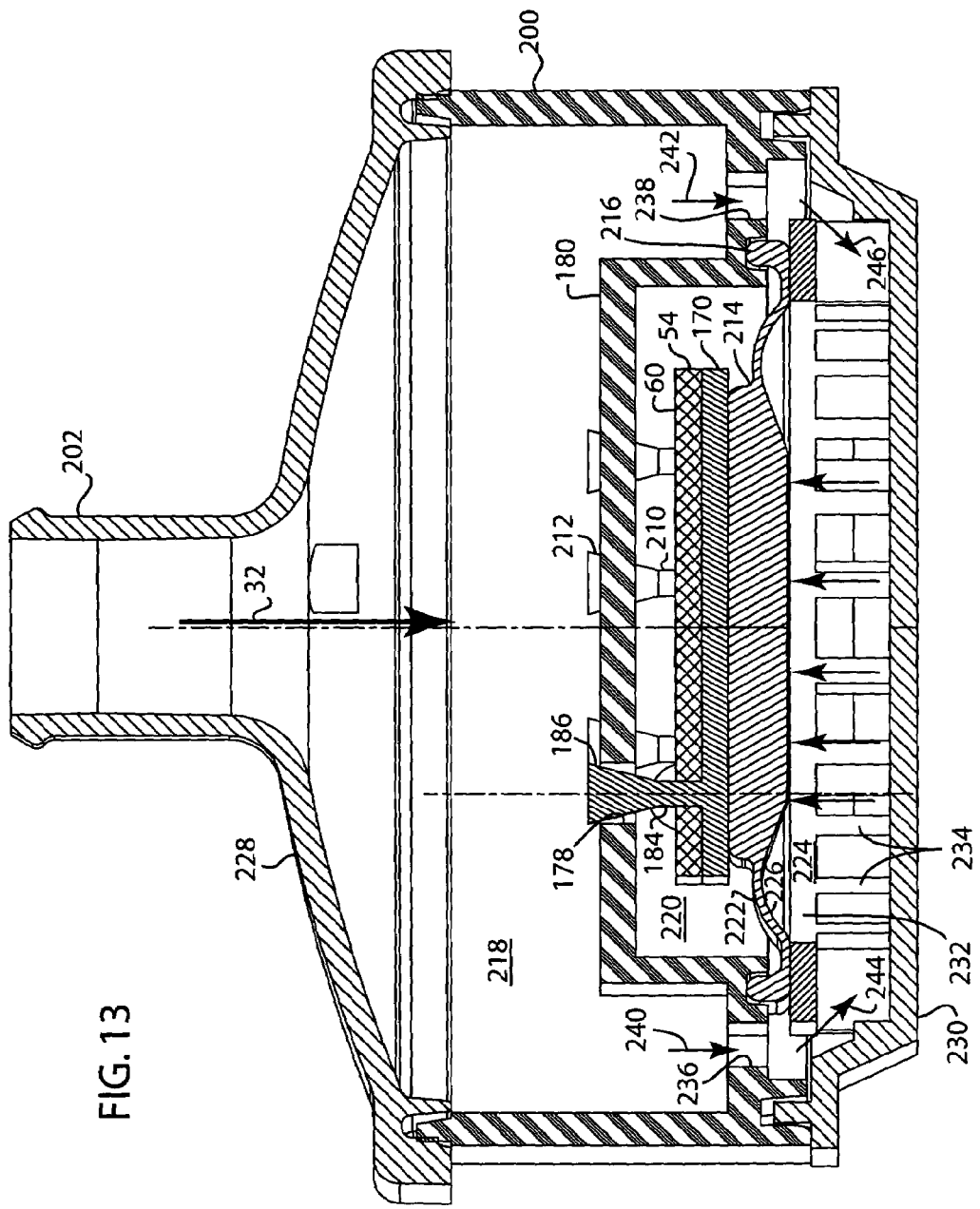
FIG. 13 is a sectional view of an inertial gas-liquid impactor separator incorporating the embodiment of FIG. 12.

The gas-liquid stream 32 flows through housing inlet 202 into chamber 218 between closure cap 228 and inner housing wall 180. Subchamber 220 is between inner housing wall 180 and diaphragm 214 and receives the gas-liquid flow stream communicated through nozzle orifices 178, 208, etc., when open. Chamber 224 is between closure cap 230 and the noted second side 226 of diaphragm 214 and includes a spacer ring 232 having a plurality of spacer legs 234 for providing a plenum in chamber 224. A plurality of communication passages 236, 238, etc. provide communication of gas-liquid flow stream pressure therethrough as shown at arrows 240, 242, etc. from chamber 218 into chamber 224 as shown at arrows 244, 246, etc. The size and number of communication passages 236, 238, etc. are selected such that the ratio of pressure on second side 226 of diaphragm 214 resulting from and relative to the pressure of the gas-liquid stream is greater than the ratio of the pressure on first side 222 of diaphragm 214 relative to and resulting from the pressure of the gas-liquid stream. Diaphragm 214 is inherently biased, or alternatively has a non-stretched position, as shown in FIG. 13, with nozzle orifices 178, 208, etc. closed by valve heads 186, 212, etc., which is the dashed line position 174 shown in FIG. 12. This inherent bias or non-stretched position of the diaphragm has a bias toward such closed position of the nozzle orifices which is greater than the pressure in chamber 224 on second side 226 of the diaphragm, e.g. at low engine speed. As the pressure of the gas-liquid stream increases, the pressure in chamber 224 on second side 226 of the diaphragm increases and overcomes the inherent bias of diaphragm 214 to stretch and move the diaphragm to the position shown in FIG. 14, which is the solid line position 172 in FIG. 12, to begin to open nozzle orifices 178, 208, by moving valve heads 186, 212, etc. away from their respective valve seats along direction 182, FIG. 12. This opening movement of the valves is opposed and counterbalanced by the pressure in subchamber 220 on first side 222 of the diaphragm now available due to the gas-liquid stream flow as shown at arrows 188, 190 through the respective nozzle orifices into subchamber 220. The noted ratio of pressures on the first and second sides of the diaphragm control the opening and closing of the valves, and vary the size of the nozzle orifices, and if desired the number of orifices opened or closed.

The cumulative flow through the nozzles is varied by variable flow actuator 170 wherein movement of such actuator varies at least one of the size and number of orifices 178, 208, etc. The cumulative flow may further be varied by varying: the axial height of valve stems 184, 210, etc. stem-to-stem; the taper, width, etc. of valve heads 186, 212, etc. from head-to-head; the size of the orifices 178, 208, etc.; the pressure ratio on opposite sides 222 and 226 of the diaphragm by varying the size and number of communication passages 236, 238; and various combinations thereof.

Figure 14:
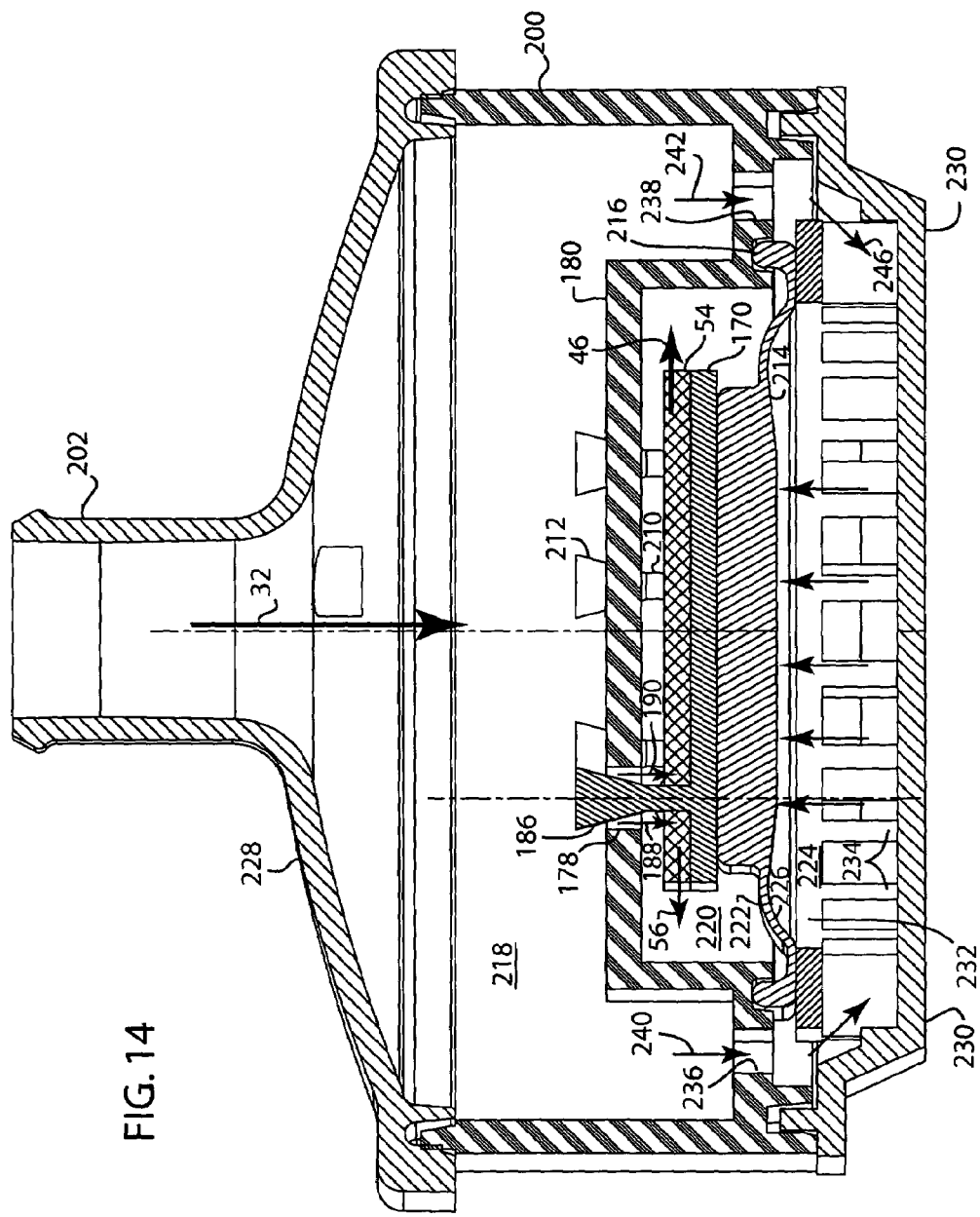
FIG. 14 is like FIG. 13 and shows another position of the actuator.
Figure 15:
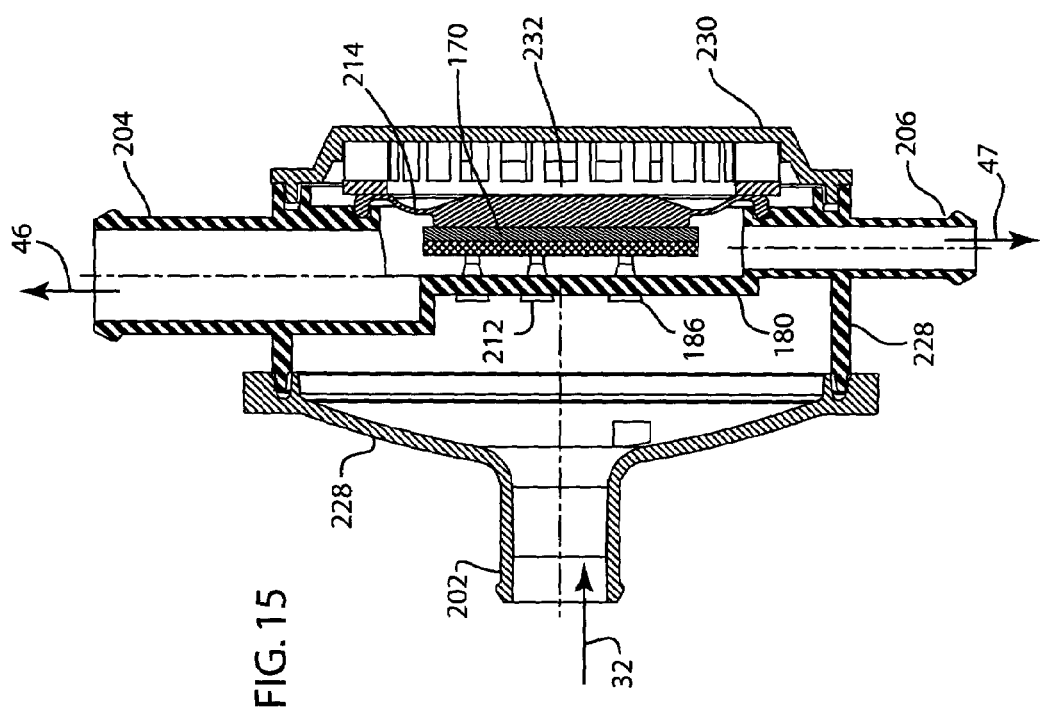
FIG. 15 is a sectional view of the construction of FIG. 13.
Figure 16:
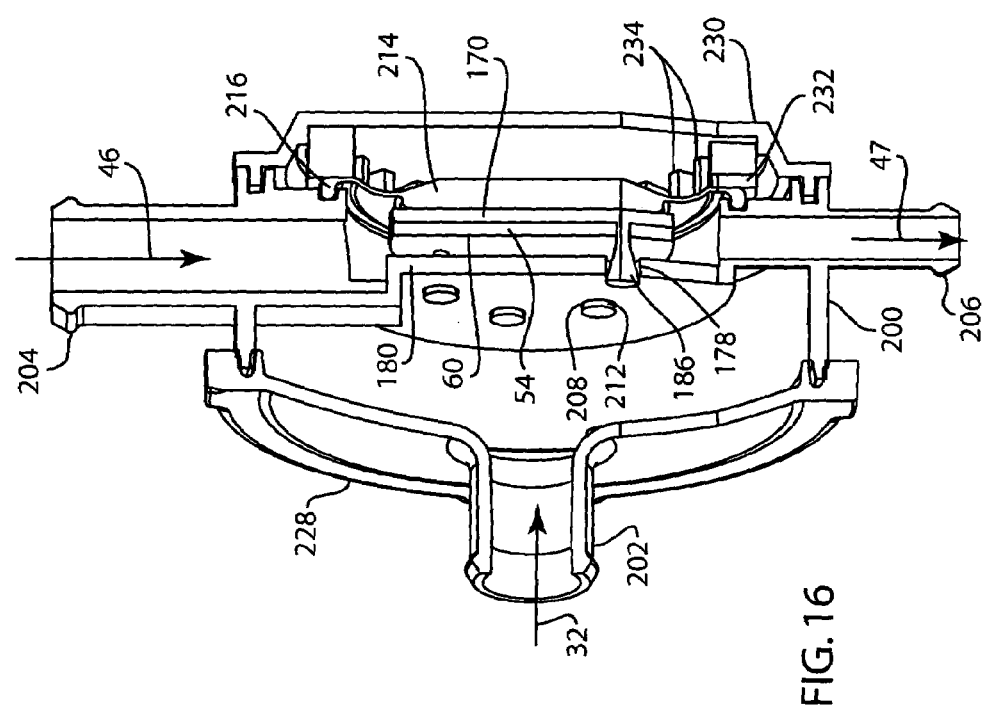
FIG. 16 is a perspective view of the construction of FIG. 13.
Figure 17:
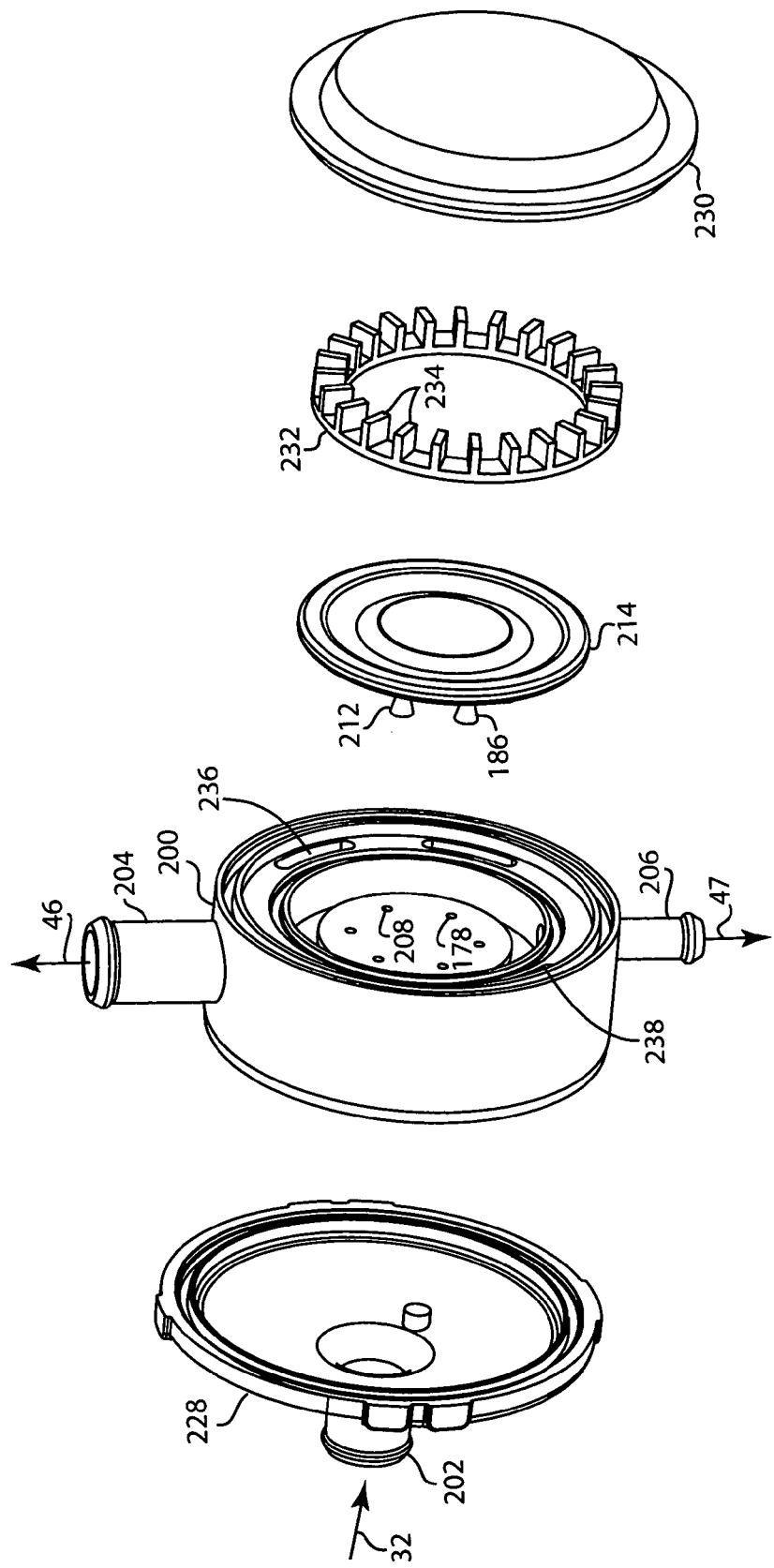
FIG. 17 is an exploded perspective view of the construction of FIG. 16.
Figure 18:
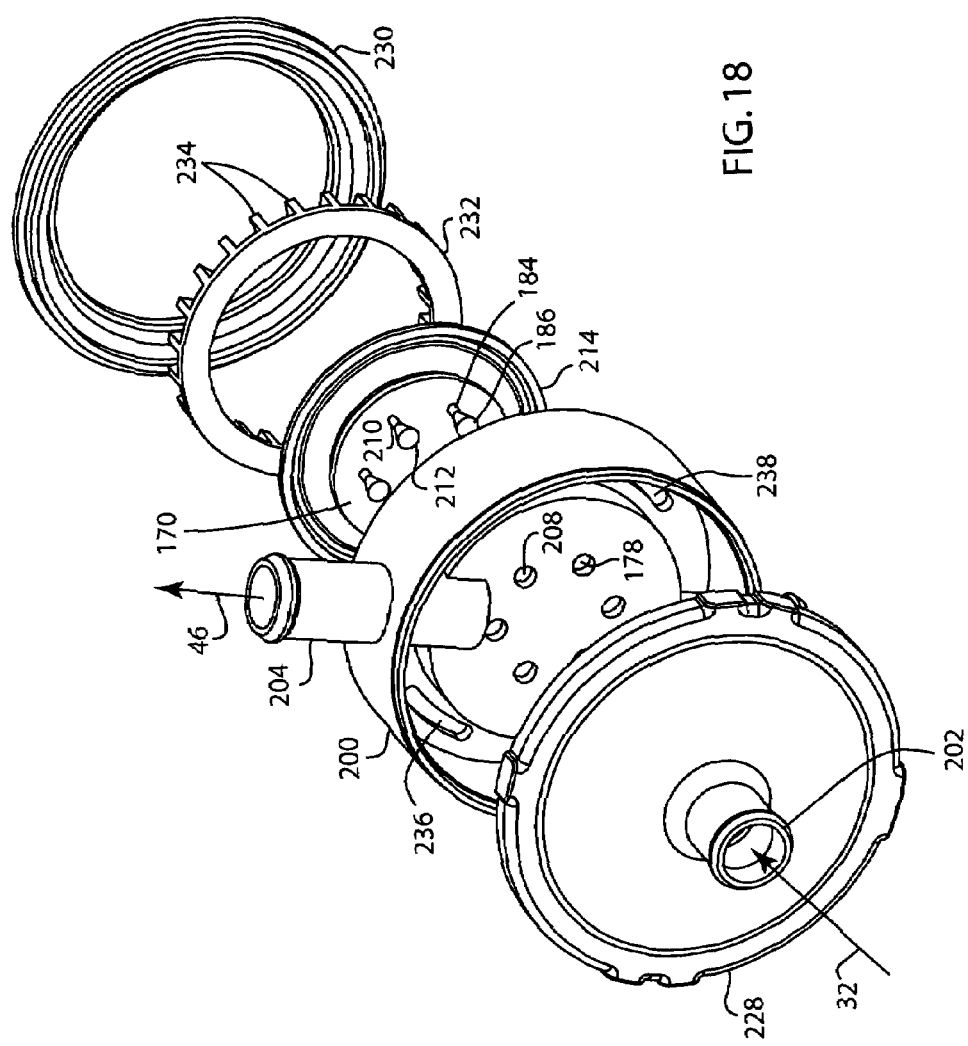
FIG. 18 is another exploded perspective view of the construction of FIG. 16.

Actuator 170 has a first position as shown in FIG. 13 and in dashed line 174 in FIG. 12, minimizing or closingly stopping cumulative flow of the gas-liquid stream through the plurality of nozzle orifices 178, 208. The actuator has a second position as shown in FIG. 14 and in solid line 172 in FIG. 12, maximizing cumulative flow through the plurality of nozzle orifices 178, 208, etc. Actuator 170 is moved by the pressure sensor provided by diaphragm 214 between the noted first and second positions and a plurality of positions therebetween in response to pressure of the gas-liquid stream to maintain such pressure constant, i.e. maintain a constant ΔP if desired. As above, this overcomes prior trade-offs in a fixed separator which is non-adaptive to changing engine or flow conditions nor different engine sizes. Side 226 of the diaphragm is exposed to pressure in the gas-liquid stream in both of the noted first and second positions of the actuator and the intermediate positions therebetween. Side 222 of the diaphragm is exposed to pressure in the gas-liquid stream in the noted second position and intermediate positions of the actuator.

FIG. 19 shows a further embodiment, with an actuator 250 translational along a direction 252 parallel to axial flow direction 58, comparably to actuator 170, FIG. 12, for opening and closing, and/or enlarging and restricting nozzle orifices such as 254, 256, etc. in housing wall 258. Actuator 250 has a plurality of valve stems 260, 262, etc. having conically shaped valve heads 264, 266, etc., engageable with respective valve seats such as 268, 270, etc. which valve seats may be conically shaped complementally to the valve heads. Unlike FIG. 12, valve heads 264, 266 in FIG. 19 are conically shaped along a taper which narrows toward a direction pointing opposite to axial flow direction 58. Variable flow actuator 250 varies the cumulative flow of the gas-liquid flow stream through nozzle orifices 254, 256, etc. in response to a given parameter, by moving back and forth as shown at arrow 252. If pressure in the gas-liquid flow stream is the designated parameter, the pressure against valve heads 264, 266 may be used to open the valves, and the pressure against such valve heads and surface 272 of the actuator disk may be used to vary and expand the cumulative flow area by increasing the cross-sectional area of the nozzle orifices. A biasing spring such as 76, 140 may bear against surface 274 of the actuator disk to bias the actuator to a closed or restricted position. Actuator 250 moves in the same direction as axial flow direction 58 to increase the noted cumulative flow, and moves in the opposite direction to axial flow direction 58 to decrease the noted cumulative flow.

Figure 22:
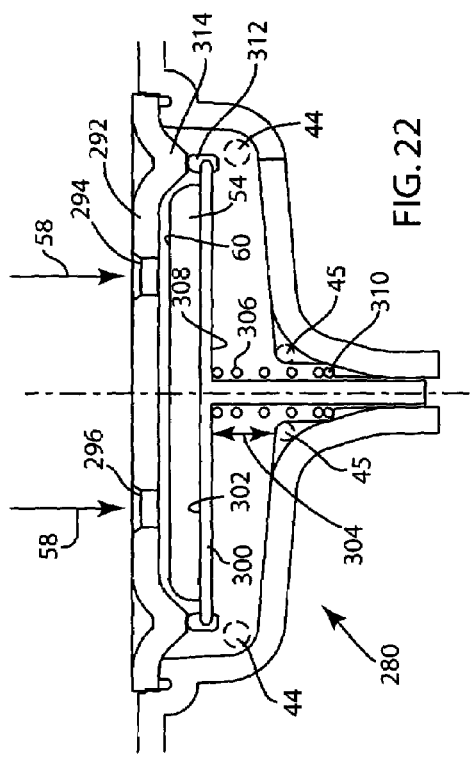
FIG. 22 is an enlarged view of a portion of FIG. 20.
Figure 21:
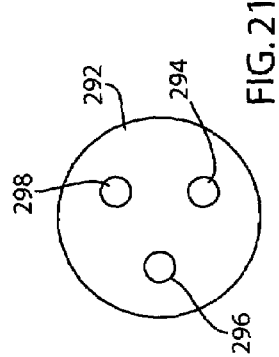
FIG. 21 is a top elevation view taken along line 21-21 of FIG. 20.
Figure 20:
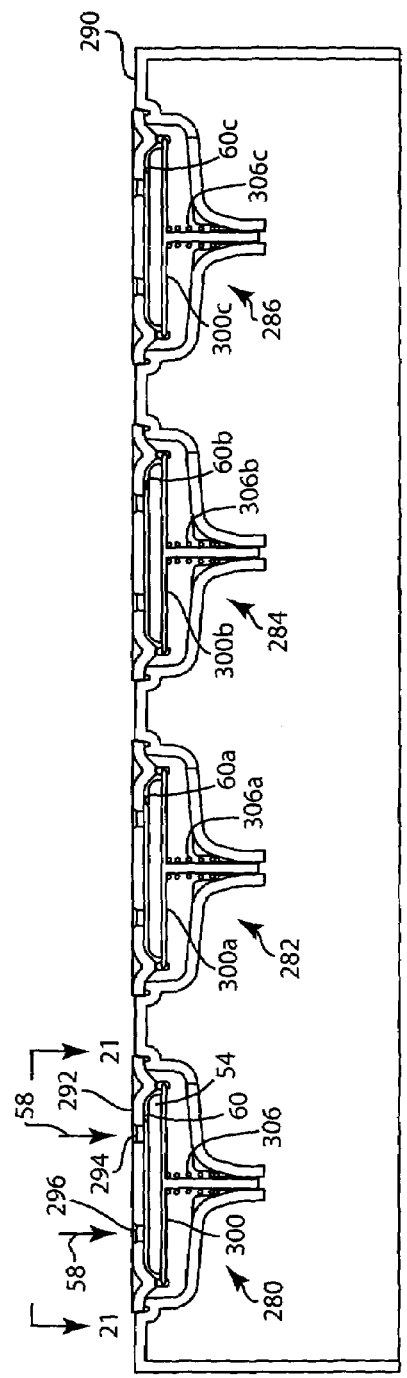
FIG. 20 is a sectional view of another embodiment of an inertial gas-liquid impactor separator in accordance with the invention.

FIGS. 20-22 show a further embodiment having a plurality of actuator assemblies 280, 282, 284, 286 in housing 290. In actuator assembly 280, housing sub-wall 292 has a plurality of nozzle orifices such as 294, 296, 298, etc. through which the gas-liquid flow stream at 58 is accelerated and strikes inertial impactor collector 54 at impaction surface 60, as above, causing liquid particle separation from the gas-liquid stream. Impactor collector 54 is mounted on variable flow actuator 300, or alternatively face surface 302 of the actuator may provide the impaction surface 60. Actuator 300 is translational back and forth as shown at arrow 304 along a direction parallel to axial flow direction 58, and is biased to a closed position (upwardly in FIG. 22), by a spring 306 bearing between underside 308 of actuator disk 300 and a spring seat 310 of the housing. In the upwardly biased closed position shown in FIG. 22, an annular gasket 312 on the outer circumference of actuator disk 300 engages the lower apex of V-shaped valve seat 314 of the housing in sealing relation to block gas stream and liquid stream flow therepast. Actuator 300 is movable in a second direction (downwardly in FIG. 22) to a second open position wherein gasket 312 is moved downwardly away from and disengaged from valve seat 314 by a gap therebetween to permit gas stream flow therepast to the housing outlet, shown schematically at 44 in FIG. 22, and to permit liquid stream flow therepast to the housing drain, shown schematically at 45 in FIG. 22. The remaining actuator assemblies 282, 284, 286 are the same.

The inertial impactor collector of the above embodiments of FIGS. 1-19 is provided in FIGS. 20-22 as a plurality of impaction surfaces 60, 60a, 60b, 60c each receiving the gas-liquid stream through a respective set of one or more orifices 294, 296, 298, etc. The variable flow actuator is provided by a plurality of impaction buttons 300, 300a, 300b, 300c each carrying a respective impaction surface 60, 60a, 60b, 60c. Each impaction button is movable between the noted closed and open positions independently of the other impaction buttons. The noted cumulative flow of the gas-liquid stream at 58 is varied by varying the number of impaction buttons in at least one of the closed and open positions. For example, cumulative flow may be increased by opening one or more of the impaction buttons, and decreased by closing one or more impaction buttons. The impaction buttons are spring biased at different spring rates, to provide differential sequential opening and closing thereof. For example, each of springs 306, 306a, 306b, 306c has a different spring rate, such that, for example, impaction button 300 opens first in response to increasing pressure, and then impaction button 300a opens in response to further increasing pressure, and then impaction button 300b opens in response to yet further increasing pressure, and so on. Impaction buttons 300, 300a, 300b, 300c are translational along a direction parallel to axial flow direction 58, and are biased to the noted closed position (upwardly in FIG. 20) along the noted direction parallel to axial flow direction 58.

Referring to FIG. 1, gas-liquid stream 32 becomes gas stream 46 and flows from upstream to downstream through the housing from inlet 42 then through nozzle orifices 50, 52, etc. then to inertial impactor collector 54 at impaction surface 60 then to outlet 44. In the embodiments of FIGS. 1-19, the noted actuator is upstream of the inertial impactor collector. In the embodiment of FIGS. 20-22, the actuator is downstream of the inertial impactor collector.

It is recognized that various equivalents, alternatives and modifications are possible within the scope of the appended claims. The invention particularly useful in closed crankcase ventilation (CCV) and open crankcase ventilation (OCV) applications, though it may be used in various other inertial gas-liquid impactor separator applications for removing liquid particles from a gas-liquid stream.

What is claimed is:

1. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, a variable flow actuator varying said cumulative flow through said one or more nozzles in response to a given parameter, wherein said one or more nozzles comprise one or more orifices, said gas-liquid stream flows axially along an axial flow direction through said one or more orifices, and said actuator is movable along a given direction relative to said one or more orifices to vary said cumulative flow, wherein said nozzle structure comprises a plurality of said nozzles comprising a plurality of said orifices providing said cumulative flow in parallel therethrough, and wherein said actuator is movable across one or more of said orifices to change the cross-sectional area thereof transverse to said axial flow direction.

2. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, a variable flow actuator varying said cumulative flow through said one or more nozzles in response to a given parameter, wherein said one or more nozzles comprise one or more orifices, said gas-liquid stream flows axially along an axial flow direction through said one or more orifices, and said actuator is movable along a given direction relative to said one or more orifices to vary said cumulative flow, and wherein said actuator is rotatable about a rotation axis parallel to said axial flow direction.

3. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, a variable flow actuator varying said cumulative flow through said one or more nozzles in response to a given parameter, wherein said one or more nozzles comprise one or more orifices, said gas-liquid stream flows axially along an axial flow direction through said one or more orifices, and said actuator is movable along a given direction relative to said one or more orifices to vary said cumulative flow, and wherein said actuator is translational along a direction transverse to said axial flow direction.

4. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, a variable flow actuator varying said cumulative flow through said one or more nozzles in response to a given parameter, wherein said one or more nozzles comprise one or more orifices, said gas-liquid stream flows axially along an axial flow direction through said one or more orifices, and said actuator is movable along a given direction relative to said one or more orifices to vary said cumulative flow, wherein said actuator is translational along a direction parallel to said axial flow direction, and wherein said actuator moves in the same direction as said axial flow direction to increase said cumulative flow, and moves in the opposite direction as said axial flow direction to decrease said cumulative flow.

5. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, a variable flow actuator varying said cumulative flow through said one or more nozzles in response to a given parameter, wherein said one or more nozzles comprise one or more orifices, said gas-liquid stream flows axially along an axial flow direction through said one or more orifices, and said actuator is movable along a given direction relative to said one or more orifices to vary said cumulative flow, wherein said actuator is translational along a direction parallel to said axial flow direction, wherein said one or more orifices comprise one or more valve seats, and said actuator comprises one or more valve stems having respective conically shaped valve heads engageable with respective said valve seats, and wherein said one or more valve heads are conically shaped along a taper which narrows toward a direction pointing opposite to said axial flow direction.

6. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, a variable flow actuator varying said cumulative flow through said one or more nozzles in response to a given parameter, wherein said one or more nozzles comprise one or more orifices, said gas-liquid stream flows axially along an axial flow direction through said one or more orifices, and said actuator is movable along a given direction relative to said one or more orifices to vary said cumulative flow, wherein said actuator is translational along a direction parallel to said axial flow direction, wherein said one or more orifices comprise one or more valve seats, and said actuator comprises one or more valve stems having respective conically shaped valve heads engageable with respective said valve seats, and wherein said one or more valve heads are conically shaped along a taper which narrows toward a direction pointing in the same direction as said axial flow direction.

7. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, a variable flow actuator varying said cumulative flow through said one or more nozzles in response to a given parameter, wherein said one or more nozzles comprise one or more orifices, said gas-liquid stream flows axially along an axial flow direction through said one or more orifices, and said actuator is movable along a given direction relative to said one or more orifices to vary said cumulative flow, wherein said actuator is translational along a direction parallel to said axial flow direction, wherein said one or more orifices comprise one or more valve seats, and said actuator comprises one or more valve stems having respective conically shaped valve heads engageable with respective said valve seats, and wherein said one or more valve seats are conically shaped complementally to said one or more valve heads.

8. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, a variable flow actuator varying said cumulative flow through said one or more nozzles in response to a given parameter, wherein said one or more nozzles comprise one or more orifices, said gas-liquid stream flows axially along an axial flow direction through said one or more orifices, and said actuator is movable alone a given direction relative to said one or more orifices to vary said cumulative flow, wherein said nozzle structure comprises a plurality of said nozzles comprising a plurality of said orifices providing said cumulative flow in parallel therethrough, wherein movement of said actuator varies at least one of the size and number of said orifices, and wherein movement of said actuator expands and restricts said orifices along a cross-sectional area thereof transverse to said axial flow direction, to vary the size of said orifices.

9. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, a variable flow actuator varying said cumulative flow through said one or more nozzles in response to a given parameter, wherein said one or more nozzles comprise one or more orifices, said gas-liquid stream flows axially along an axial flow direction through said one or more orifices, and said actuator is movable along a given direction relative to said one or more orifices to vary said cumulative flow, wherein said gas-liquid stream becomes said gas stream and flows from upstream to downstream through said housing from said inlet then through said one or more orifices then to said inertial impactor collector then to said outlet, and wherein said actuator is downstream of said inertial impactor collector.

10. The inertial gas-liquid impactor separator according to claim 9 wherein said actuator is movable between a first closed position blocking gas stream flow therepast to said outlet, and a second open position permitting gas stream flow therepast to said outlet.

11. The inertial gas-liquid impactor separator according to claim 10 wherein said inertial impactor collector comprises a plurality of impaction surfaces each receiving said gas-liquid stream through a respective set of one or more orifices, and wherein said actuator comprises a plurality of impaction buttons each carrying a respective said impaction surface, each said impaction button being movable between said closed and open positions independently of the other impaction buttons, wherein said cumulative flow is varied by varying the number of said impaction buttons in at least one of said closed and open positions.

12. The inertial gas-liquid impactor separator according to claim 11 wherein said impaction buttons are spring biased at different spring rates, to provide differential sequential opening thereof.

13. The inertial gas-liquid impactor separator according to claim 11 wherein said impaction buttons are translational along a direction parallel to said axial flow direction.

14. The inertial gas-liquid impactor separator according to claim 13 wherein said impaction buttons are biased to said closed position along said direction parallel to said axial flow direction.

* * * * *